United States Patent [19]

Palmer, Jr.

[11] Patent Number: 5,767,189
[45] Date of Patent: Jun. 16, 1998

[54] DURABLE HYDROPHILIC POLYMER COATINGS

[75] Inventor: Charles Francis Palmer, Jr., Newark, Del.

[73] Assignee: E. I. duPont de Nemours and Company, Wilmington, Del.

[21] Appl. No.: 655,795

[22] Filed: May 31, 1996

[51] Int. Cl.$^6$ .......................................................... C08L 67/02
[52] U.S. Cl. ............................ 524/239; 525/408; 525/437
[58] Field of Search ...................................... 525/437, 408; 524/539

[56] References Cited

U.S. PATENT DOCUMENTS

| | | | |
|---|---|---|---|
| 2,677,700 | 5/1954 | Jackson | 252/89 |
| 3,101,374 | 8/1963 | Patton | 252/89 |
| 3,619,269 | 11/1971 | McIntyre et al. | 117/118 |
| 3,620,826 | 11/1971 | Machell | 117/139.5 CQ |
| 3,959,230 | 5/1976 | Hays | 260/75 |
| 3,981,807 | 9/1976 | Raynolds | 252/8.8 |
| 4,098,757 | 7/1978 | Gordon | 260/42.55 |
| 4,258,849 | 3/1981 | Miller | 206/812 |
| 4,372,447 | 2/1983 | Miller | 206/812 |
| 4,540,749 | 9/1985 | Meyer, Jr. et al. | 525/437 |
| 4,569,974 | 2/1986 | Gillberg-LaForce et al. | 525/437 |
| 4,863,619 | 9/1989 | Borcher et al. | 252/8.6 |
| 5,041,225 | 8/1991 | Norman | 210/500.36 |
| 5,230,949 | 7/1993 | Howard et al. | 428/224 |
| 5,239,019 | 8/1993 | Halling et al. | 525/437 |

FOREIGN PATENT DOCUMENTS

| | | |
|---|---|---|
| 0 218 212 A | 4/1987 | European Pat. Off. . |
| A 0 110 267 | 6/1987 | European Pat. Off. . |
| A 0 248 194 | 12/1987 | European Pat. Off. . |
| 0 261 832 A | 3/1988 | European Pat. Off. . |
| 0 681 865 A | 11/1995 | European Pat. Off. . |
| 2 120 077 A | 8/1972 | France . |
| A 2 123 323 | 9/1972 | France . |
| A2 663 338 | 12/1991 | France . |
| 18 15 361 A | 7/1970 | Germany . |
| 322678 | 1/1984 | Germany . |
| 74011353 | 3/1974 | Japan . |
| 04240266 | 1/1991 | Japan . |
| 04136277 | 5/1992 | Japan . |
| 04 272 276 A | 9/1992 | Japan . |
| 05163676 | 6/1993 | Japan . |
| 05311123 | 11/1993 | Japan . |
| 06074500 | 3/1994 | Japan . |
| 473 938 A | 6/1969 | Switzerland . |
| A1 172 085 | 11/1969 | United Kingdom . |
| 1189581 | 4/1970 | United Kingdom . |
| 2099828 | 12/1982 | United Kingdom . |
| WO 89 10997 A | 11/1989 | WIPO . |

Primary Examiner—Patricia A. Short

[57] ABSTRACT

Compositions useful for imparting durable hydrophilic polymer coatings to polyester, polypropylene or polyethylene fibers or fabrics comprising A) an aqueous dispersion of 1) a hydrophilic copolyester having repeating segments of a polyoxyethylene diester and a polyalkylene diester, and 2) a polypropylene oxide polymer capped on one or both ends with an alkyl or ester group, said polymer having more than 4 propylene oxide units and an average molecular weight of at least about 300; B) a mixture of 1) an organic solvent, 2) a hydrophilic copolyester having repeating segments of a polyoxyethylene diester and a polyalkylene diester, and 3) a polypropylene oxide polymer capped on one or both ends with an alkyl or monoester group, said polymer having more than 4 propylene oxide units and an average molecular weight of at least about 300; C) an aqueous dispersion of 1) a hydrophilic copolyester having repeating segments of a polyoxyethylene diester and a polyalkylene diester, and 2) a polypropylene glycol having an average molecular weight greater than 1100; or D) a mixture of 1) an organic solvent, 2) a hydrophilic copolyester having repeating segments of a polyoxyethylene diester and a polyalkylene diester, and 3) a polypropylene glycol having an average molecular weight greater than 1100 are disclosed.

6 Claims, No Drawings

DURABLE HYDROPHILIC POLYMER COATINGS

FIELD OF THE INVENTION

This invention relates to certain polymer compositions and their use to impart a durable hydrophilic coating to woven and non-woven polyester, polypropylene and polyethylene fabrics or fibers.

BACKGROUND OF THE INVENTION

Polyester, polypropylene and polyethylene woven and non-woven fabrics have many applications for which their hydrophobic characteristics are undesirable. These include applications where a high ability to transmit water is desirable, such as for diapers, adult incontinence pads, agricultural fabrics for landscaping or mulching, and some filtration devices; applications where wicking away of moisture is desirable for comfort reasons, such as for certain clothing and sportswear purposes; and applications where it is desirable to make the surface of a fiber more hydrophilic for better adhesion or easier incorporation into water-borne compositions such as cement mixtures or paper pulps.

U.S. Pat. No. 4,863,619 of Borcher et al. issued Sep. 5, 1989, discloses organic materials useful as vicosity reducing agents in the manufacture of fabric treatment products, in particular soil release polymers.

Polypropylene or polyethylene is commonly used as the liner (coverstock) in baby diapers and adult incontinence pads, and in these applications it is next to the wearer's skin. By design, moisture must pass through the polypropylene or polyethylene layer into the absorbent layer below. Since polypropylene or polyethylene is naturally hydrophobic, it must be treated to allow the moisture to pass through quickly and not run off the top of the diaper or pad.

In diaper manufacture in the U.S. the above liner is commonly treated with a small amount of a surfactant wetting agent, such as an alcohol ethoxylate, to improve moisture transport through the polypropylene or polyethylene layer. Since the alcohol ethoxylate is usually water soluble, it dissolves and reduces the surface tension of the water. This causes the moisture to wet the polypropylene or polyethylene and pass through more quickly. The use of an alcohol ethoxylate has two important drawbacks, however. Since it dissolves off, little remains to improve passage of any second or subsequent exposures to moisture. The capacity of the absorbent layer is reduced as well, since its absorptivity is based on capillary action, which is adversely affected by absorption of the alcohol ethoxylate.

A coating is needed which would allow moisture to pass through the polypropylene or polyethylene liner quickly, but that will not readily wash off. The present invention provides such a coating and a process for its application.

Polypropylene, polyethylene or polyester are also commonly used in generation of nonwovens used in protective garments such as medical, surgical, laboratory and other garments. Such garments can be uncomfortable due to poor hand and lack of moisture transport. A coating or treatment is needed which softens the nonwoven fabrics or fibers and wicks away moisture to enhance comfort. The present invention provides such a coating or treatment. Thus the compositions, methods, fabrics and fibers of the present invention are useful in clothing applications and other applications where improved wicking or moisture transport through a woven or non-woven fabric of polyester, polypropylene or polyethylene is important.

SUMMARY OF THE INVENTION

The present invention comprises the following compositions:

A. a composition comprising an aqueous dispersion of: 1) a hydrophilic copolyester having repeating segments of a polyoxyethylene diester and a polyalkylene diester, and 2) a polypropylene oxide polymer capped on one or both ends with an alkyl or ester group, said polymer having more than 4 propylene oxide units and an average molecular weight of at least about 300;

B. a mixture comprising 1) an organic solvent, 2) a hydrophilic copolyester having repeating segments of a polyoxyethylene diester and a polyalkylene diester, and 3) a polypropylene oxide polymer capped on one or both ends with an alkyl or ester group, said polymer having more than 4 propylene oxide units and an average molecular weight of at least about 300;

C. a composition comprising an aqueous dispersion of 1) a hydrophilic copolyester having repeating segments of a polyoxyethylene diester and a polyalkylene diester, and 2) a polypropylene glycol having an average molecular weight greater than 1100; or D. a composition comprising a mixture of 1) an organic solvent, 2) a hydrophilic copolyester having repeating segments of a polyoxyethylene diester and a polyalkylene diester, and 3) a polypropylene glycol having an average molecular weight greater than 1100.

The present invention further comprises the above dispersions or mixtures wherein the hydrophilic copolyester has been modified by reaction with at least one polyol containing at least 3 hydroxy groups, or with at least one polyoxyethylene glycol, or with a mixture thereof, to yield a copolyester having from 1 to about 40 weight percent of post reactant repeating units.

The present invention further comprises a method for imparting a durable hydrophilic coating to polyester, polypropylene or polyethylene fabric or fiber comprising application to the surface of the fabric or fiber of an effective amount of at least one of the inventive compositions A, B, C or D as described above, or said compositions containing a hydrophilic copolyester which has been modified as described above.

The present invention further comprises a method for imparting a durable hydrophilic coating to polyester, polypropylene or polyethylene fabric or fiber comprising application to the surface of the fabric or fiber of an effective amount of at least one composition selected from: 1) a mixture of an organic solvent and a hydrophilic copolyester having repeating segments of a polyoxyethylene diester and a polyalkylene diester; 2) a polypropylene oxide polymer capped on one or both ends with an alkyl or ester group, said polymer having more than 4 propylene oxide units and an average molecular weight of at least about 300, an aqueous dispersion thereof, or a mixture thereof with an organic solvent, 3) a polypropylene glycol having an average molecular weight greater than 1100 an aqueous dispersion thereof, or a mixture thereof with an organic solvent, 4) an aqueous dispersion of polyvinyl alcohol and a polypropylene oxide polymer capped on one or both ends with an alkyl or ester group, said polymer having more than 4 propylene oxide units and an average molecular weight of at least about 300, 5) an aqueous dispersion of polyacrylamide and a polypropylene oxide polymer capped on one or both ends with an alkyl or ester group, said polymer having more than 4 propylene oxide units and an average molecular weight of at least about 300, 6) a mixture of polyvinyl alcohol and polypropylene glycol, said polypropylene glycol having an average molecular weight greater than 1100, and 7) a mixture of polyacrylamide and polypropylene glycol, said polypropylene glycol having an average molecular weight greater than 1100.

The present invention further comprises a woven or nonwoven polyester, polyethylene or polypropylene fabric or fiber having applied to its surface an effective amount of at least one of the inventive compositions A, B, C or D as described above, or said compositions containing a hydrophilic copolyester which has been modified as described above.

The present invention further comprises a woven or nonwoven polyester, polyethylene or polypropylene fabric or fiber having applied to its surface an effective amount of at least one composition selected from 1) a mixture of an organic solvent and a hydrophilic copolyester having repeating segments of a polyoxyethylene diester and a polyalkylene diester; 2) a polypropylene oxide polymer capped on one or both ends with an alkyl or ester group, said polymer having more than 4 propylene oxide units and an average molecular weight of at least about 300, an aqueous dispersion thereof, or a mixture thereof with an organic solvent, 3) a polypropylene glycol having an average molecular weight greater than 1100, an aqueous dispersion thereof, or a mixture thereof with an organic solvent 4) an aqueous dispersion of polyvinyl alcohol and a polypropylene oxide polymer capped on one or both ends with an alkyl or ester group, said polymer having more than 4 propylene oxide units and an average molecular weight of at least about 300, 5) an aqueous dispersion of polyacrylamide and a polypropylene oxide polymer capped on one or both ends with an alkyl or ester group, said polymer having more than 4 propylene oxide units and an average molecular weight of at least about 300, 6) a mixture of polyvinyl alcohol and polypropylene glycol, said polypropylene glycol having an average molecular weight greater than 1100, and 7) a mixture of polyacrylamide and polypropylene glycol, said polypropylene glycol having an average molecular weight greater than 1100.

DETAILED DESCRIPTION OF THE INVENTION

The present invention comprises compositions that when applied to polyester, polypropylene or polyethylene fabric or fiber impart a durable hydrophilic coating. The present invention further comprises methods for imparting a durable hydrophilic coating to polyester, polypropylene and polyethylene fabric or fiber comprising application of the compositions as described above. The present invention further comprises, in woven or nonwoven form, polyester, polypropylene, or polyethylene fabric or fiber having such a coating applied to its surface.

By the term "organic solvent" is meant those organic solvents incapable of forming three dimensional networks of strong hydrogen bonds. Examples of suitable solvents include dibasic esters, esters (for example ethyl acetate), ketones (for example acetone), ethers (for example tetrahydrofuran), and tertiary amides (for example dimethylformamide or dimethylacetamide).

The term "hydrophilic copolyester" is used to mean a copolyester containing both polyoxyethylene diester and alkylene diester segments. They may be simple copolyesters, i.e., they may contain only polyoxyethylene diester and polyalkylene diester segments, the copolyester being derived from a single polyethylene oxide, diester and glycol. Polyethylene oxides of various molecular weights, dimethyl terephthalate and ethylene glycol are the most common raw materials for these copolymers, mainly because of cost and availability. Numerous variations on the comonomers used to prepare these simple hydrophilic copolyesters are possible. Other alkylene glycols such as propylene and butylene glycols are suitable for the replacement of all or part of the ethylene glycol, or they may be incorporated in minor amounts into the polyethylene oxide employed. Simple ether glycols such as diethylene glycol, and cycloaliphatic diols such as 1,4-cyclohexane dimethanol, are also appropriate as comonomers for the base copolyesters. Among other diesters that may be used to replace all or part of the dimethyl terephthalate are diesters of aliphatic diacids such as adipic and sebacic acids, and diesters of aromatic diacids such as isophthalic and sulfonated isophthalic acids. The base copolymers may additionally contain one or more of the other components, e.g., an acidic group, a basic group, an ionizable salt group, an antioxidant group, a group that absorbs ultraviolet light, a dyestuff group and polymeric groups containing a plurality of either hydroxy groups or amido groups, all of which are disclosed by McIntyre et al. in U.S. Pat. Nos. 3,416,952; 3,557,039; and 3,619,269.

The hydrophilic copolyesters are prepared by condensation at relatively high temperatures under reduced pressures. Temperatures of about 200° to 280° C., or even higher, and pressure not higher than about 35 mm Hg are generally employed. Byproduct alcohols and part of the low molecular weight glycols originally charged are removed by distillation during the condensation process. As the process proceeds the viscosity of the copolyester increases.

A preferred hydrophilic copolyester is a polyester copolymer with repeating segments of ethylene terephthalate units containing 10–50% by weight of polyoxyethylene terephthalate units, derived from a polyoxyethylene glycol of average molecular weight of from about 300 to about 6,000, and the molar ratio of ethylene terephthalate units to polyoxyethylene terephthalate units in the polymeric compound is between 2:1 and 6:1. A more preferred copolymer is that wherein the polyoxyethylene terephthalate units are derived from a polyoxyethylene glycol with an average molecular weight of from about 1,000 to about 4,000. These copolymers are disclosed in U.S. Pat. No. 3,416,952. Examples of these copolymers include the commercially available "ZELCON" 4780 (available from E. I. du Pont de Nemours and Company, Wilmington, Del.) and "MILEASE" T (available from Imperial Chemical Industries, Limited, London, England); both have the Chemical Abstracts Service Registry No. 9016-88-0. Both "ZELCON" 4780 and "MILEASE" T are sold in the aqueous dispersion form containing up to 85% water. It is preferable to use the dehydrated polymer to prepare the dispersions to avoid the incorporation of excess moisture. The dehydrated polymer is obtained by drying the above-mentioned commercial dispersions, or can be obtained in the concentrated form from the manufacturers. An example of the latter is "ZELCON" PG, the concentrated form of "ZELCON" 5126, and is obtainable from the E. I. du Pont de Nemours and Company, Wilmington, Del.

In addition, these hydrophilic polyesters may be further modified after being formed by reaction with one or more polyols containing three or more hydroxy groups or one or more polyoxyethylene glycols or a mixture of one or more of such polyols and one or more of such glycols, as disclosed in U.S. Pat. No. 5,239,019. The modified copolyesters are hydrophilic in nature. They consist of polyols containing three or more hydroxy groups, and polyoxyethylene glycols. The polyols may also contain other functional groups such as, e.g., ester and ether groups. Examples of polyols suitable for modification of the copolyesters include simple polyols such as glycerin, pentaerythritol and sorbitol, low molecular weight ether polyols derived from the simple polyols such as diglycerol and di- and tripentaerythritol, and polymeric polyols such as the partially hydrolyzed polyvinyl acetates and partially esterified derivatives of cellulose. Ethylene oxide adducts of the above polyols are also suitable. The polyoxyethylene glycols may vary in molecular weight from about 300 to 6,000 depending on the intended application. Molecular weights of about 600 to 3,000 are preferred, with 800 to 1600 being most preferred. Besides their hydroxy and ether segments, they may optionally contain other functional groups such as amino groups and quaternized amino groups.

The post-reaction of the copolyester with additional hydrophilic entities is carried out under milder conditions than those used in synthesizing the base copolyester. Most are carried out at temperatures of about 150° C. or above, at atmospheric pressure, with temperatures of 180° to 200° C. being preferred. In some cases vacuum is also applied, but the overall conditions are less vigorous than in the preparation of the base copolyesters. Additionally, when the post-reactant is charged to the heated base copolymer, a reduction in viscosity may initially occur, indicating a reduction in the average molecular weight of the polymer. As the post-reaction proceeds, the viscosity of the mass may increase. However, the post-reaction step is not carried out long enough or under sufficiently severe conditions so as to result in an intractable mass.

Suitable polypropylene oxide polymers for use herein include a polymer of polypropylene oxide which is capped on one or both ends with alkyl or ester groups, said polymer having more than 4 propylene oxide units and an average molecular weight of at least 300. Suitable butyl end-capped polypropylene oxide polymers are available from Union Carbide Chemicals and Plastics Company under the trade name "UCON" LB series products. These are sold commercially as water-insoluble lubricants for various specialized applications and other uses. "UCON" LB-65, LB-385, LB-525, LB-625, LB-1145 and LB-1715 have average molecular weights of 340, 1200, 1420, 1550, 2080 and 2490, respectively. Other suitable end-capped polypropylene polymers are available under the trade name "ARCOL" R-series, available from the ARCO Chemical Company, Newtown Square, Pa. "ARCOL" R-2085 and R-2150 are propoxylated branched fatty alcohols having an average molecular weight between 1100 and 1200. R-2150 also contains about 2% ethylene oxide. "ARCOL" R-2151 is a propoxylated linear fatty alcohol. Other suitable polypropylene oxide polymers for use herein include polypropylene glycols having an average molecular weight greater than 1100. Preferably the polypropylene oxide polymer is endcapped.

The above-defined compositions of or used in the present invention optionally contain at least one of a dispersing agent, surfactant, wetting agent, thickening agent, antistatic agent, coloring agent, fiber lubricant, softener, other surface active agent and hydrophilic agent, other ingredients which impart desirable properties for a particular application, or a mixture thereof.

The above defined aqueous based compositions of the present invention preferentially include a wetting or dispersing agent to aid in dispersion. Still more preferentially the wetting or dispersing agent is a nonionic surfactant having ethylene oxide moieties and hydrophobic portions. Suitable examples of these materials include ethoxylated alkyl phenols such as some "IGEPAL" nonionic surfactants sold by Rhone-Poulenc Inc., Cranbury N.J., such as "IGEPAL" CO-970; lauryl alcohol ethoxylated with about 50 ethylene oxide moieties, such as "ETHAL" LA 50 available from Ethox Chemicals Inc. Greenville, S.C.; and branched fatty alcohol ethoxylates such as "MERPOL" SE, available from E. I. du Pont de Nemours and Company, Wilmington, Del. Even more preferentially the nonionic surfactant is an ethoxylated branched chain alcohol such as "POLYWET" A or B, containing a mixture of branched alcohol ethoxylates with about 2 to 13 ethoxy groups along with a solubilizing agent such as sodium xylene sulfonate, which is available from Peach State Labs Inc., Rome, Ga.

Suitable wetting or dispersing agents or surfactants also include a cationic surfactant, such as "ARQUAD" 12/50 (dodecyl trimethylammonium chloride in water) or 16/50 (hexadecyl trimethylammonium chloride in water), available from Akzo Nobel Chemicals, Inc. Chicago, Ill.; sodium alkylnapthalene sulfonate salts such as "ALKANOL"XC and branched fatty alcohol ethoxylates such as "MERPOL"SE both available from E. I. du Pont de Nemours and Company, Wilmington, Del.; polyoxyethylated (4) isodecyl alcohol such as "RHODASURF"DA-530 available from Rhone-Poulenc Surfactants and Specialties, Cranbury, N.J.; and sodium alkylbenzene sulfonate in water such as "BIOSOFT"D-40 available from Stephan Company, Northfield, Ill.

A preferred example of the dispersion composition of the present invention is a dispersion in water of a polyoxyethylene terephthalate and polyethylene terephthalate block copolymer such as "ZELCON" PG, available from E. I. du Pont de Nemours and Company, Wilmington, Del.; a butyl-endcapped polypropylene oxide such as "UCON"LB-series fluid polymers available from the Union Carbide Chemicals and Plastics Company, and "POLYWET" A or B available from Peach State Labs, Inc.

The present invention further comprises a method for imparting a durable hydrophilic coating to polyester, polypropylene or polyethylene fabric or fiber comprising application to the surface of the fabric or fiber of an effective amount of the above-defined inventive compositions.

Alternatively, the present invention also comprises a method for imparting a durable hydrophilic coating to polyester, polypropylene or polyethylene fabric or fiber comprising application to the surface of the fabric or fiber of an effective amount of at least one composition selected from: 1) a mixture of an organic solvent and a hydrophilic copolyester having repeating segments of a polyoxyethylene diester and a polyalkylene diester, 2) a polypropylene oxide polymer capped on one or both ends with an alkyl or ester group, said polymer having more than 4 propylene oxide units and an average molecular weight of at least about 300, an aqueous dispersion thereof, or a mixture thereof with an organic solvent, 3) a polypropylene glycol having an average molecular weight greater than 1100, an aqueous dispersion thereof, or a mixture thereof with an organic solvent, 4) an aqueous dispersion of polyvinyl alcohol and a polypropylene oxide polymer capped on one or both ends with an alkyl or ester group, said polymer having more than 4 propylene oxide units and an average molecular weight of at least about 300, 5) an aqueous dispersion of polyacrylamide and a polypropylene oxide polymer capped on one or both ends with an alkyl or ester group, said polymer having more than 4 propylene oxide units and an average molecular weight of at least about 300, 6) a mixture of polyvinyl alcohol and polypropylene glycol having an average molecular weight greater than 1100, and 7) a mixture of polyacrylamide and polypropylene glycol having an average molecular weight greater than 1100.

These compositions and the inventive compositions A, B, C and D previously described may be applied to the fabric or fiber by any suitable means such as wiping, painting, dipping, foaming, feeding at the nip of a roller, spraying, or other means. The composition is typically applied at a minimum level of at least 0.48% weight of solids on fiber, preferably at least 0.7% weight of solids on fiber, and most preferably 1.25% or higher weight of solids on fiber to achieve water wetability and durability. Application at lower levels will improve hydrophilic character. After drying or removal of the solvent, a durable hydrophilic coating remains on the fabric or fiber surface. This coating causes water placed on the surface to rapidly wet the fabric and to pass through the fabric layer.

The present invention further comprises a woven or nonwoven polyester, polyethylene or polypropylene fabric or fiber having applied to its surface any of the above inventive compositions or treated by any of the above inventive methods.

The inventive compositions and methods impart durable hydrophilic character to polyester, polypropylene or polyethylene fabrics or fibers in woven or nonwoven form. Such durability is measured in the trade by what are called "insult tests", and repeated exposures to moisture or water washes are referred to as "insults". In the "insult tests" described below on polypropylene, the inventive compositions and the compositions used in the method of the present invention imparted hydrophilic character with durability. Preferably, combining a block copolymer of polyoxyethylene terephthalate and polyethylene terephthalate with butyl-endcapped poly(propylene oxide) polymers and applying from an aqueous dispersion with a wetting agent containing a mixture of a polyoxyethylated branched fatty alcohol and sodium xylene sulfonate provides a coating having enhanced durability (up to fifteen or more water washes). A preferred composition is "ZELCON" PG mixed with 20% "UCON" LB-625, and other "ZELCON" polymer/"UCON" combinations. The polypropylene oxide monoethers show better performance than either the polypropylene oxide glycols or the polybutylene oxide polymers tested.

The compositions, methods, fabrics and fibers of the present invention are useful in diapers, incontinence pads, agricultural fabrics for landscaping or mulching, and filtration devices wherein the ability to transmit water through the fabric is desirable. The present invention is also useful in clothing and sportswear where wicking away of moisture is desirable. In particular nonwoven protective garments treated in accordance with the present invention are more comfortable. It has also been found that the compositions of the present invention act as a softener for polypropylene or polyethylene as well. The compositions of the present invention are also useful in applications where it is desirable to make a fiber surface more hydrophilic for better adhesion or easier incorporation into water-borne compositions such as cement mixtures or paper pulps.

In the following examples tradenames used are defined as follows. "ZELCON" PG polymer is a polyoxyethylene terephthalate and polyethylene terephthalate block copolymer, which is generated by dehydrating "ZELCON" 5126.

"ALKANOL" XC is a sodium alkylnapthalene sulfonate salt.

"MERPOL" SH and "MERPOL" SE are branched fatty alcohol ethoxylates with average molecular weights between about 350 and 650. "MERPOL" A is an octyl alcohol phosphate ester mixture.

"AVITEX" DN is a quaternary methylsulfonium poly (oxy-1,2-ethanediyl) octadecylammonium salt.

"ELVANOL" 90-50 is fully hydrolyzed poly(vinyl acetate); a 4% solids aqueous solution at 20° C. gives a viscosity of 12–15 cP as determined by the Hoeppler falling ball method.

"ZELCON" 5126, "ZELCON" PG, "ALKANOL" XC, "MERPOL" SH, "MERPOL" SE, "MERPOL" A, "AVITEX" DN, and "ELVANOL" 90-50 are available from the E. I. du Pont de Nemours and Company.

"MILEASE" T is a polyoxyethylene terephthalate and polyethylene terephthalate block copolymer. It is available from the Imperial Chemical Industries Limited, London, England.

"UCON" LB-series and "UCON" 50-HB series lubricants are available from the Union Carbide Chemicals and Plastics Company, South Charleston, W.V., USA 25303.

"ARCOL" R-2085 and R-2150 are propoxylated branched fatty alcohols with molecular weights between 1100 and 1200. R-2150 also contains about 2% ethylene oxide. "ARCOL" R-2151 is a propoxylated linear fatty alcohol. They are available from the ARCO Chemical Company, Newtown Square, Pa., 19073 USA.

"WITCONOL" APS, F-26-46, and APM are propoxylated fatty alcohols available from the Witco Corporation, Greenwhich, Conn.

"PLURACOLS" 1010 and 2010 are polypropylene glycols with average molecular weights of 1050 and 2000, respectively, and are available from BASF Wyandotte Corporation, Wyandotte, Mich., 48192 USA.

"POLYWET" A and B are both a mixture of a polyoxyethylated branched fatty alcohol (isodecyl) and sodium xylene sulfonate, and they are available from Peach State Labs, Inc., Rome, Ga., 30162 USA.

"ARQUAD" 12/50 or 16/50 are each a cationic surfactant, available from Akzo Nobel Chemicals, Inc., Chicago, Ill., 60606 USA. "ARQUAD" 12/50 is a solution of dodecyl trimethylammonium chloride in water. "ARQUAD" 16/50 is an aqueous solution of hexadecyl trimethylammonium chloride.

"MONAZOLINE" O, 1-hydroxyethyl-2-oleylimidazoline is a cationic surfactant, available from Mona Industries, Inc. Paterson, N.J., 07544 USA.

"RHODASURF" DA-530 is polyoxyethylated (4) isodecyl alcohol. "IGEPAL" CO-970 is polyoxyethylated (50) nonylphenol. Both are available from Rhone-Poulenc Inc. Cranbury, N.J. 08512 USA.

"ETHAL" LA-50 is polyoxyethylated (50) lauryl alcohol, available from the Ethox Chemicals, Inc., Greenville, S.C., 29606 USA.

"BIOSOFT" D-40 is a 40% aqueous solution of a sodium alkylbenzene sulfonate, available from the Stepan Company, Northfield, Ill. 60093 USA.

EXAMPLE 1

A dispersion was prepared using the components described below.

| Ingredients | Equivalence | Weight |
|---|---|---|
| "ZELCON" PG | 8.3 wt % | 22.9 g |
| "UCON" LB-625 | 20% of "ZELCON" PG | 4.6 g |
| "POLYWET" A | 13% of "ZELCON" PG | 3.0 g |
| Distilled water (1/2ice) | 89 wt % | 243.0 g |
| Total dispersion (total weight) | | 273.5 g |

A round bottom flask was equipped with a stirrer, thermocouple, nitrogen line and charged with the "ZELCON" PG polymer. The vessel was swept well with nitrogen, then heated to 180° C. It was stirred until fully melted. While it was melting, the "UCON" LB-625 was dispersed in a mixture of the water and "POLYWET" A in a rapidly stirring blender. Then the molten "ZELCON" PG polymer was added and the mixture stirred for 3–5 minutes or until well mixed. After diluting, if necessary to lower the viscosity, the mixture was sonicated or homogenized to complete the dispersion process.

The weight of "ZELCON" PG given above was its initial weight. After melting, a small amount estimated at 2 to 3 grams clung to the sides of the flask and was lost in transfer.

EXAMPLES 2–19

The following compositions were prepared using the procedure of Example 1. All formulations were aqueous; after the initial dispersion was made to a concentration of between 5 to 25% solids, more water was added to dilute the dispersion for application in the pad bath used for performance testing. This allowed the adjustment of the desired pickup of material onto the fabric. The pickup of aqueous solution by the fabric (wet pickup) was generally in the range of 66 to 82% of the weight of the fabric. This allowed a calculation of the solid material applied to the fabric. The formula used:

TABLE 1

| Ex. No. | Hydrophilic Copolyester | Polypropylene Oxide Polymer | Surfactant(s) |
|---|---|---|---|
| 2 | "ZELCON" PG: 55.0 g | "UCON" LB 625: 5.0 g | "POLYWET" A: 5.0 g |
| 3 | "ZELCON" PG: 21.2 g | "UCON" LB-625: 6.3 g | "POLYWET" A: 3.0 g |
| 4 | "ZELCON" PG: 22.9 g | "UCON" LB-625: 4.6 g | "POLYWET" A: 3.0 g |
| 5 | "ZELCON" PG: 25.0 g | "UCON" LB-625: 2.5 g | "POLYWET" A: 3.0 g |
| 6 | "ZELCON" PG: 25.0 g | "UCON" LB-1145: 2.5 g | "POLYWET" A: 3.0 g |
| 7 | "ZELCON" PG: 25.0 g | "UCON" LB-1715: 2.5 g | "POLYWET" A: 3.0 g |
| 8 | "ZELCON" PG: 22.9 g | "UCON" LB-385: 4.6 g | "POLYWET" A: 3.0 g |
| 9 | "ZELCON" PG: 45 g | "UCON" LB-625: 6.8 g | "POLYWET" B: 5.3 g |
| 10 | "ZELCON" PG: 45 g | "UCON" LB-625: 4.5 g | "POLYWET" B: 5.3 g |
| 11 | "ZELCON" PG: 45 g | "UCON" LB-625: 2.3 g | "POLYWET" B: 5.3 g |
| 12 | "ZELCON" PG: 45 g | "UCON" LB-625: 9.0 g | "POLYWET" B: 5.3 g |
| 13 | "ZELCON" PG: 45 g | "UCON" LB-1715: 2.3 g | "POLYWET" B: 5.3 g |
| 14 | "ZELCON" PG: 45 g | "UCON" LB-1145: 2.3 g | "POLYWET" B: 5.3 g |
| 15 | "ZELCON" PG: 22.9 g | Note 1: 4.6 g | "POLYWET" A: 3.0 g |
| 16 | "ZELCON" PG: 22.9 g | Note 2: 4.6 g | "POLYWET" A: 3.0 g |

TABLE 1-continued

| Ex. No. | Hydrophilic Copolyester | Polypropylene Oxide Polymer | Surfactant(s) |
|---|---|---|---|
| 17 | "ZELCON" PG: 22.9 g | Note 3: 4.6 g | "POLYWET" A: 3.0 g |
| 18 | "ZELCON" PG: 45 g | "PLURACOL" 1010: 9.0 g | "POLYWET" B: 5.3 g |
| 19 | "ZELCON" PG: 45 g | "PLURACOL" 2010: 9.0 g | "POLYWET" B: 5.3 g |

Note 1: This was "ARCOL" R-2085, a polypropylene oxide polymer end-capped with a 13-carbon alkyl group.
Note 2: This was "ARCOL" R-2150, a polypropylene oxide polymer end-capped with a 13-carbon alkyl group, and containing about 2% ethylene oxide.
Note 3: This was "ARCOL" R-2151, a polypropylene oxide polymer end-capped with 12- to 16-carbon alkyl groups.

The compositions were diluted as described to make a 200 gram bath, then applied to the test polypropylene fiber. In the tests below, the fiber was a spunbond polypropylene sheet. After solution application, the fabric was dried at 235° F. (113° C.) for 2 minutes and tested. A variation on a standard water repellency test was used. If a drop of pure water wet out completely on the fabric, the fabric was rated w/w for "water wet". If not, test water solutions with increasing amounts of isopropyl alcohol (IPA) were used. Webs that resist penetration of pure water, but absorb a 2% IPA water solution were given a rating of 1; a rating of 2 corresponded to 5% IPA, a rating of 3 corresponded to 10% IPA, and a rating of 4 corresponded to 20% IPA. The first solution that wet the fabric was noted, and the fabric was then assigned that number. Untreated polypropylene rated a "4" on this test, and lower numbers than 4 indicated improved wettability.

Treated fabrics that rate w/w were "insulted" to test durability and then rerated again. The insult test comprised cutting out a circular piece of the treated fabric, placing the circle on a glass fritted funnel, and then sucking 100 mL of distilled water rapidly through the circle of fabric. The circle was then dried again and retested for water wetting. The more cycles of "insults" with full water wetting remaining, the better (these are rated as "successful" in the table below. A plus (+) following a number indicates that the tests were discontinued before failure occurred.). The results of the performance testing are listed in Table 2.

TABLE 2

Performance Testing

| | | Water Repellency Tests | | No. of |
|---|---|---|---|---|
| Example No. | Bath % Solids | Initial | After 1st "Insult" | Successful "Insults" |
| 2 | 5.4% | w/w | w/w | 7 |
| 3 | 3.1% | w/w | w/w | 7 |
| 4 | 3.0% | w/w | w/w | 10+ |
| 5 | 3.0% | w/w | 2 | 0 |
| 6 | 3.0% | w/w | w/w | 4 |
| 7 | 3.0% | w/w | w/w | 2 |
| 8 | 1.25% | w/w | w/w | 3 |
| 9 | 2.5% | w/w | w/w | 3+ |
| 10 | 2.5% | w/w | w/w | 3+ |
| 11 | 2.5% | w/w | w/w | 3+ |
| 12 | 2.5% | w/w | w/w | 3+ |
| 13 | 2.5% | w/w | w/w | 3+ |
| 14 | 2.5% | w/w | w/w | 3+ |

TABLE 2-continued

| | | Performance Testing | | |
| --- | --- | --- | --- | --- |
| | | Water Repellency Tests | | No. of |
| Example No. | Bath % Solids | Initial | After 1st "Insult" | Successful "Insults" |
| 15 | 1.25% | w/w | w/w | 13 |
| 16 | 1.25% | w/w | w/w | 15+ |
| 17 | 1.25% | w/w | w/w | 15+ |
| 18 | 2.5% | w/w | 2 | 0 |
| 19 | 2.5% | w/w | w/w | 3+ |

While the above Example 5 showed poor durability, other tests with comparable formulations such as Example 10 were satisfactory.

The above tests showed that "PLURACOL" 1010, a non-endcapped polypropylene glycol with a molecular weight of 1050, had little durability. "PLURACOL" 2010, with a molecular weight about 2000, had satisfactory durability when used with "POLYWET" B. Mixtures of "ZELCON" PG with "UCON" LB-625 had satisfactory durability with ratios of "ZELCON" to "UCON" ranging from 5/1 to 20/1. Mixtures of "ZELCON"PG with "UCON" LB-1715 and "UCON" LB-1145 also had satisfactory durability with "POLYWET" B.

EXAMPLES 20–22

The following compositions were prepared using the procedures of Example 1 and tested as described in Example 2.

TABLE 3

| Ex. No. | Hydrophilic Copolyester | Polypropylene Oxide Polymer | Surfactant(s) |
| --- | --- | --- | --- |
| 20 | "ZELCON" PG: 110 g | "UCON" LB 65: 10 g | "ARQUAD" 12/50: 10 g "IGEPAL" CO-970: 5 g "MERPOL" SE: 10 drops "POLYWET" A * |
| 21 | "ZELCON" PG: 110 g | "UCON" LB 625: 10 g | "ARQUAD" 12/50: 10 g "IGEPAL" CO-970: 5 g "MERPOL" SE: 10 drops "POLYWET" A * |
| 22 | "ZELCON" PG: 110 g | "UCON" 50-HB-55: 10 g | "ARQUAD" 12/50: 10 g "IGEPAL" CO-970: 5 g "MERPOL" SE: 10 drops "POLYWET" A * |

* In each case 0.3 g of "POLYWET" A was added to 100 g of bath after the initial dispersion was added.

The "UCON" 50-HB-55 is an alkyl encapped polymer containing equal amounts by weight of oxyethylene and oxypropylene groups.

TABLE 4

| | | Performance Testing | | |
| --- | --- | --- | --- | --- |
| | | Water Repellency Tests | | No. of |
| Ex. No. | Bath % Solids | Initial | After 1st "Insult" | Successful "Insults" |
| 20 | 3.2% | w/w | w/w | 1 |
| 21 | 2.9% | w/w | w/w | 3 |
| 22 | 2.8% | w/w | 3 | 0 |

These examples showed the "UCON" LB series worked, that LB-625 was better than LB-65, but that the "UCON" 50-HB-55 gave little durability.

EXAMPLES 23–27

The following compositions were prepared using the procedures of Example 1 and tested as described in Example 2.

TABLE 5

| Ex. No. | Hydrophilic Copolyester | Polypropylene Oxide Polymer | Surfactant(s) |
| --- | --- | --- | --- |
| 23 | "ZELCON" PG: 57 g | "UCON" LB 625: 11.4 g | "MERPOL" SE: 3.8 g SQD. XYL. SULF.: 2.6 g |
| 24 | "ZELCON" PG: 57 g | "UCON" LB 625: 11.4 g | "RHODASURF" DA-530: 3.8 g SOD. XYL. SULF.: 2.3 g |
| 25 | "ZELCON" PG: 57 g | "UCON" LB 625: 11.4 g | "MERPOL" SH: 7.6 g SOD. XYL. SULF.: 2.5 g |
| 26 | "ZELCON" PG: 57 g | "UCON" LB 625: 11.4 g | "MERPOL" SH: 3.8 g "MERPOL" SE: 1.9 g SOD. XYL. SULF.: 2.3 g |
| 27 | "ZELCON" PG: 57 g | "UCON" LB-625: 6.8 g | "BIOSOFT" D-40: 7.2 g "RHODASURF" DA-530: 1.2 g |

Note: SOD.XYL.SULF. is sodium xylene sulfonate, a solubilizing agent.

TABLE 6

| | | Performance Testing | | |
| --- | --- | --- | --- | --- |
| | | Water Repellency Tests | | No. of |
| Ex. No. | Bath % Solids | Initial | After 1st "Insult" | Successful "Insult" |
| 23 | 1.5% | w/w | w/w | 4 |
| 24 | 1.5% | w/w | w/w | 6 |
| 25 | 1.5% | w/w | w/w | 3 |
| 26 | 1.5% | w/w | w/w | 1 |
| 27 | 2.5% | w/w | w/w | 3+ |

The above tests showed that the inventive composition has satisfactory durability using a number of surfactants other than "POLYWET" A or B.

EXAMPLES 28–36

The following compositions were prepared using the procedures of Example 1 and tested as described in Example 2.

TABLE 7

| Ex. No. | Hydrophilic Copolyester | Polypropylene Oxide Polymer | Surfactant(s) |
| --- | --- | --- | --- |
| 28 | "ZELCON" PG: 55 g | "UCON" LB 625: 10 g | LA 50: 5 g "POLYWET" A * |
| 29 | "ZELCON" PG: 55 g | "UCON" LB 625: 15 g | LA 50: 5 g "POLYWET" A * |
| 30 | "ZELCON" PG: 55 g | "UCON" LB 1145: 10 g | LA 50: 5 g "POLYWET" A * |
| 31 | "ZELCON" PG: 55 g | "UCON" LB 1715: 10 g | LA 50: 5 g "POLYWET" A * |
| 32 | "ZELCON" PG: 22.9 g | Note 1: 4.6 g | LA 50: 1.5 g "POLYWET" A: 3.0 g |
| 33 | "ZELCON" PG: 22.9 g | Note 2: 4.6 g | LA 50: 1.5 g "POLYWET" A: 3.0 g |
| 34 | "ZELCON" PG: 22.9 g | Note 3: 4.6 g | LA 50: 1.5 g "POLYWET" A: 3.0 g |
| 35 | "ZELCON" PG: 22.9 g | Tridecyl Alcohol 4.6 g | LA 50: 1.5 g "POLYWET" A: 3.0 g |

TABLE 7-continued

| Ex. No. | Hydrophilic Copolyester | Polypropylene Oxide Polymer | Surfactant(s) |
|---|---|---|---|
| 36 | "ZELCON" PG: 22.9 g | Oleyl: 4.6 g Alcohol | LA 50: 1.5 g "POLYWET" A: 3.0 g |

* In these cases, 0.3 g of "POLYWET" A was added to 100 g of bath after the initial dispersion was added.
Note 1: This was "WITCONOL" APS, a polypropylene oxide polymer with about 11 propylene oxide groups and end-capped with an 18-carbon alkyl group.
Note 2: This was "WITCONOL" F26-46, a polypropylene oxide polymer end-capped with an 18-carbon alkenyl (oleyl) group.
Note 3: This was "WITCONOL" APM, a polypropylene oxide polymer with about 3 propylene oxide groups and end-capped with a 14-carbon alkyl group.

TABLE 8

Performance Testing

| Ex. No. | Bath % Solids | Water Repellency Tests | | No. of Successful "Insults" |
|---|---|---|---|---|
| | | Initial | After 1st "Insult" | |
| 28 | 2.2% | w/w | w/w | 8 |
| 29 | 2.4% | w/w | w/w | 8 |
| 30 | 2.1% | w/w | w/w | 7 |
| 31 | 2.1% | w/w | w/w | 8 |
| 32 | 1.25% | w/w | 1 | 0 |
| 33 | 1.25% | w/w | w/w | 1 |
| 34 | 1.25% | <1 | 3 | 0 |
| 35 | 1.25% | <1 | 3 | 0 |
| 36 | 1.25% | >1 | >3 | 0 |

The above tests showed satisfactory results with a variety of propylene oxide polymers end-capped with a variety of alkyl/alkenyl groups, but showed unsatisfactory results when the number of propylene oxide groups in the chain was only 3. Results were also unsatisfactory when tridecyl or oleyl alcohol was substituted for the propylene oxide polymers.

EXAMPLES 37–41

The following compositions were prepared using the procedure of Example 1 and tested as described in Example 2. In this series of tests, two different orders of addition of ingredients were tested. In Table 10, Column A, the order of addition was the same as in Example 1. In Table 10, Column B, the hydrophilic copolyester and propylene oxide polymers were mixed together first and then dispersed in the surfactant.

TABLE 9

| Ex. No. | Hydrophilic Copolyester | Polypropylene Oxide Polymer | Surfactant(s) |
|---|---|---|---|
| 37 | Note 1: 55 g | "UCON" LB 625: 10 g | LA 50: 5 g "POLYWET" A * |
| 38 | Note 2: 55 g | "UCON" LB 625: 10 g | LA 50: 5 g "POLYWET" A * |
| 39 | Note 3: 55 g | "UCON" LB 625: 10 g | LA 50: 5 g "POLYWET" A * |
| 40 | Note 4: 55 g | "UCON" LB 625: 10 g | LA 50: 5 g "POLYWET" A * |
| 41 | Note 5: 55 g | "UCON" LB 625: 10 g | LA 50: 5 g "POLYWET" A * |

TABLE 9-continued

| Ex. No. | Hydrophilic Copolyester | Polypropylene Oxide Polymer | Surfactant(s) |
|---|---|---|---|

* In each case, 0.3 g of "POLYWET" A was added to 100 g of bath after the initial dispersion was added.
Note 1: This polymer corresponded to "ZELCON" PG except that 10 mole % of the dimethyl terephthalate was replaced by 2-dodecenyl-1-succinic anhydride.
Note 2: This polymer corresponded to "ZELCON" PG except that 2 mole % of the dimethyl terephthalate was replaced by 2-dodecenyl-1-succinic anhydride.
Note 3: This polymer corresponded to "ZELCON" PG except that pentaerythritol was replaced by triethanolamine.
Note 4: This polymer corresponded to "ZELCON" PG except that all of the dimethyl terephthalate was replaced by a mixture of 95 mole % of diethyl sebacate and 5 mole % of 2-dodecenyl-1-succinic anhydride.
Note 5: This polymer was made by post-reaction of "ZELCON" PG with 10% by weight of "AVITEX" DN.

table 10

Performance Testing

| Ex. No. | Bath % Solids | Water Repellency Tests | | No. of Successful "Insults" | |
|---|---|---|---|---|---|
| | | Initial | After 1st "Insult" | A | B |
| 37 | 2.8% | w/w | w/w | 5+ | 5+ |
| 38 | 2.9% | w/w | w/w | 3 | 5+ |
| 39 | 3.4% | w/w | w/w | 3 | 4 |
| 40 | 3.0% | w/w | w/w | 2 | 2 |
| 41 | 3.1% | w/w | w/w | 4 | 5+ |

Results were satisfactory with each of the hydrophilic copolyesters tested, and with either order of addition.

EXAMPLES 42–52

The following compositions were prepared using the procedures of Examples 1 and 2, and tested as described in Example 2.

TABLE 11

| Ex. No. | Hydrophilic Polymer | Polypropylene Oxide Polymer | Surfactant(s) |
|---|---|---|---|
| 42 | None | "UCON" LB 625: 10 g | "ARQUAD" 12/50: 10 g "IGEPAL" CO-970: 5 g "MERPOL" SE: 5 drops "POLYWET" A * |
| 43 | "ZELCON" PG: 110 g | "UCON" LB 625: 20 g | "ARQUAD" 12/50: 10 g "IGEPAL" CO-970: 5g "MERPOL" SE: 10 drops "POLYWET" A * |
| 44 | "ZELCON" PG: 110 g | "UCON" LB 625: 10 g | "ARQUAD" 2/50: 10 g "MERPOL" SE: 10 drops "POLYWET" A * |
| 45 | "ZELCON" PG: 25 g | None | "POLYWET" B: 2.4 g |
| 46 | Note 1: 34 g | "UCON" LB-625: 6.3 g | "POLYWET" B: 1.2 g |
| 47 | Note 2: 50 g | "UCON" LB-625: 9.2 g | "POLYWET" B: 1.7 g |
| 48 | Note 3: 50 g | "UCON" LB-625: 9.2 g | "POLYWET" B: 1.7 g |
| 49 | "ELVANOL" 90–50: 4.2 g | None | "POLYWET" B: 0.6 g |
| 50 | "ELVANOL" 90–50: 3.1 g | "UCON" LB-625: 0.6 g | "POLYWET" B: 0.6 g |
| 51 | Note 4: 4.2 g | None | "POLYWET" B: 0.6 g |

TABLE 11-continued

| Ex. No. | Hydrophilic Polymer | Polypropylene Oxide Polymer | Surfactant(s) |
|---|---|---|---|
| 52 | Note 4: 3.1 g | "UCON" LB-625: 0.61 g | "POLYWET" B: 0.6 g |

* In these cases, 0.3 g of "POLYWET" A was added to 100 g of bath after the initial dispersion was added.
Note 1: This polymer corresponded to "ZELCON" PG except that 2 mole % of the dimethyl terephthalate was replaced by 2-dodecenyl-1-succinic anhydride.
Note 2: This polymer corresponded to "ZELCON" PG except that 10 mole % of the dimethyl terephthalate was replaced by 2-dodecenyl-1-succinic anhydride.
Note 3: This polymer corresponded to "ZELCON" PG except that 25 mole % of the dimethyl terephthalate was replaced by 2-dodecenyl-1-succinic anhydride.
Note 4: Polyacrylamide AF 2545 was used and was 5% hydrolyzed and had a molecular weight of approximately 500,000. It was obtained from Dowell Schlumberger, 6717 S. 61st W. Ave., Tulsa, OK 74131, USA.

TABLE 12

Performance Testing

| Ex. No. | Bath % Solids | Water Repellency Tests Initial | After 1st "Insult" | No. of Successful "Insults" |
|---|---|---|---|---|
| 42 | 0.7% | w/w | w/w | 2 |
| 43 | 3.0% | w/w | w/w | 5 |
| 44 | 3.0% | w/w | w/w | 5 |
| 45 | 1.5% | >1 | 3 | 0 |
| 46 | 1.5% | w/w | w/w | 2 |
| 47 | 1.5% | w/w | w/w | 2 |
| 48 | 1.5% | >1 | >1 | 0 |
| 49 | 2.0% | <1 | 1 | 0 |
| 50 | 1.9% | w/w | w/w | 3+ |
| 51 | 1.5% | 2 | 3 | 0 |
| 52 | 1.5% | w/w | w/w | 3+ |

The above series showed that "UCON" LB 625 with dispersants and "POLYWET" A has some durability, but that better durability is obtained with the addition of "ZELCON" PG.

The above tests also showed that "ZELCON" PG is ineffective without the presence of a polypropylene oxide polymer. "ZELCON" PG in which 2 or 10% of the dimethyl terephthalate was replaced by 2-dodecenyl-1-succinic anhydride was satisfactory, but a sample where 25% was replaced was not satisfactory at the concentration used in the bath.

"ELVANOL" 90-50 had unsatisfactory performance when used with "POLYWET" B alone, but had satisfactory durability when used with "POLYWET" and "UCON" LB-625.

The polyacrylamide AF 2545 had unsatisfactory performance when used with "POLYWET" B alone, but had satisfactory durability when used with "POLYWET" and "UCON" LB-625.

EXAMPLES 53–56

The following compositions were prepared using the procedure of Examples 1 and tested as described in Example 2.

TABLE 13

| Ex. No. | Hydrophilic Copolyester | Polypropylene Oxide Polymer | Surfactant(s) |
|---|---|---|---|
| 53 | "ZELCON" PG: 55 g | "UCON" LB 625: 10 g | "MONAZOLINE" O: 5 g "IGEPAL" CO-970: 2.5 g |

TABLE 13-continued

| Ex. No. | Hydrophilic Copolyester | Polypropylene Oxide Polymer | Surfactant(s) |
|---|---|---|---|
| 54 | "ZELCON" PG: 55 g | "UCON" LB 625: 10 g | "POLYWET" A * "MONAZOLINE" O: 2.5 g "IGEPAL" CO-970: 2.5 g "POLYWET" A * |
| 55 | "ZELCON" PG: 55 g | "UCON" LB 625: 10 g | "IGEPAL" CO-970: 5 g "POLYWET" A * |
| 56 | "ZELCON" PG: 55 g | "UCON" LB 625: 10 g | "LA 50: 5 g "POLYWET" A * |

* In each case, 0.3 g of "POLYWET" A was added to 100 g of bath after the initial dispersion was added.

TABLE 14

Performance Testing

| Ex. No. | Bath % Solids | Water Repellency Tests Initial | After 1st "Insult" | No. of Successful "Insults" |
|---|---|---|---|---|
| 53 | 3.2% | w/w | w/w | 5+ |
| 54 | 3.2% | w/w | w/w | 5+ |
| 55 | 2.9% | w/w | w/w | 4 |
| 56 | 3.2% | w/w | w/w | 4 |

These examples showed that "ZELCON" plus "UCON" gave durable coating whether it was used with a mixed cationic/nonionic dispersant as in Examples 53 and 54, or nonionic as in Examples 55 and 56.

EXAMPLES 57–61

The following compositions were prepared using the procedure of Examples 1 and tested as described in Example 2.

TABLE 15

| Ex. No. | Hydrophilic Copolyester | Polypropylene Oxide Polymer | Surfactant(s) |
|---|---|---|---|
| 57 | "ZELCON" PG: 110 g | "UCON" LB 385: 10 g | "ARQUAD" 12/50: 10 g "POLYWET" A * |
| 58 | "ZELCON" PG: 110 g | "PLURACOL" 2010: 10 g | "ARQUAD" 12/50: 10 g "POLYWET" A * |
| 59 | "ZELCON" PG: 110 g | "UCON" LB 385: 10 g | "ARQUAD" 16/50: 10 g "POLYWET" A * |
| 60 | "ZELCON" PG: 110 g | "PLURACOL" 1010: 10 g | "ARQUAD" 16/50: 10 g "POLYWET" A * |
| 61 | "ZELCON" PG: 110 g | "PLURACOL" 2010: 10 g | "ARQUAD" 16/50: 10 g "POLYWET" A * |

* In each case, 0.3 g of "POLYWET" A was added to 100 g of bath after the initial dispersion was added.

TABLE 16

Performance Testing

| Ex. No | Bath % Solids | Water Repellency Tests Initial | After 1st "Insult" | No. of Successful "Insults" |
|---|---|---|---|---|
| 57 | 2.9% | w/w | w/w | 3 |
| 58 | 2.8% | w/w | w/w | 1 |

TABLE 16-continued

| | | Performance Testing | | |
| --- | --- | --- | --- | --- |
| | | Water Repellency Tests | | No. of |
| Ex. No | Bath % Solids | Initial | After 1st "Insult" | Successful "Insults" |
| 59 | 3.0% | w/w | w/w | 1 |
| 60 | 3.0% | w/w | 3 | 0 |
| 61 | 3.1% | w/w | w/w | 1 |

This data showed that polypropylene glycol with an average molecular weight of 2000 was effective but an average molecular weight of 1000 was less effective; and that "UCON" 385 was better in performance than polypropylene glycol with an average molecular weight of 2000.

EXAMPLES 62-66

The following compositions were prepared using the procedures of Examples 1 and 2, and tested as described in Example 2. In the application tests below, two different levels of application were tested. In Table 18 Column A, the treating bath used contained 1.25% solids. In Table 18 Column B, the treating bath used contained 2.5% solids.

TABLE 17

| Ex. No. | Hydrophilic Copolyester | Polypropylene Oxide Polymer | Surfactant(s) |
| --- | --- | --- | --- |
| 62 | Note 1: 22.9 g | "UCON" LB-625: 4.6 g | "POLYWET" A: 3.0 g |
| 63 | "ZELCON" PG: 22.9 g | "UCON" LB-625: 4.6 g | "MERPOL" SE: 3.0 g "MERPOL" A: 0.2 g "ALKANOL" XC: 0.2 g |
| 64 | "ZELCON" PG: 172 g | "UCON" LB-385: 34.5 g | "POLYWET" A: 22.5 g |
| 65 | "ZELCON" PG: 172 g | "UCON" LB-525: 34.5 g | "POLYWET" A: 22.5 g |
| 66 | "ZELCON" PG: 172 g | "UCON" LB-385: 34.5 g | "POLYWET" A: 22.5 g |

Note 1: This polymer corresponded to "ZELCON" PG except that 10 mole % of the ingredients were replaced by polyethylene glycol methyl ether (950 molecular weight)

TABLE 18

| | Performance Testing | | | | |
| --- | --- | --- | --- | --- | --- |
| | Bath % Solids | | Water Repellency Tests | | No. of Successful "Insults" |
| Ex. No. | A | B | Initial | After 1st "Insult" | A | B |
| 62 | 1.25% | 2.5% | w/w | w/w | 10+ | 15+ |
| 63 | 1.25% | 2.5% | w/w | w/w | 4 | 13 |
| 64 | 1.25% | 2.5% | w/w | w/w | 4 | 15+ |
| 65 | 1.25% | 2.5% | w/w | w/w | 10+ | 15+ |
| 66 | 1.25% | 2.5% | w/w | w/w | 9 | 15+ |

The above table showed the effect of increasing the loading level in the application bath. Example 63 showed satisfactory results with a surfactant mixture containing nonionic ("MERPOL" SE and A) and anionic ("ALKANOL" XC) surfactants. Examples 65 and 66 showed satisfactory results using lower molecular weight (MW) polypropylene oxide polymers (average MW 1420 and 1200, respectively, versus "UCON" LB 625 MW of 1550).

EXAMPLE 67

The following compositions were prepared using the procedure of Example 1 and tested as described in Example 2.

TABLE 19

| Ex. No. | Hydrophilic Copolyester | Polypropylene Oxide Polymer | Surfactant(s) |
| --- | --- | --- | --- |
| 67 | "ZELCON" PG: 514 g | "UCON" LB 625: 103 g | "POLYWET" A: 67.3 g |

The above sample was tested as an agent to speed the rate of wicking of a spun-laced polyester/wood pulp composite fabric ("SONTARA" available from E. I. du Pont de Nemours & Co., Wilmington, Del.) versus a control test in which no Example 67 composition was used. The lower end of one inch (2.54 cm) wide strips of the test fabric were immersed in water and the time for the water to climb vertically along the fabric was measured. The results below are the average of two trials each.

TABLE 20

| Solids % in Bath | Wicking Time: 2.54 cm (sec.) | Wicking Time: 5.08 cm (sec.) |
| --- | --- | --- |
| 2.0% | 7.28 | 34.08 |
| 6.0% | 6.71 | 30.60 |
| None | 12.64 | 52.90 |

The above test showed that the inventive composition nearly doubled the rate of wicking on a polyester/wood pulp composite fabric.

EXAMPLES 68-72

The compositions of examples 68-70 were prepared using the procedure of Example 1 and then were diluted in water as described below and padded onto a woven polyester fabric. Before testing, the polyester fabric was scoured with hot water (90° C.), dried, then further scoured with hot dichloromethane to remove all finishing chemicals. Examples 71-72 were prepared by dissolution of the listed polymer in ethyl acetate solvent. Each was then padded onto polypropylene fabric and allowed to dry at ambient temperatures before testing.

TABLE 21

| Ex. No. | Hydrophilic Polymer | Polypropylene Oxide Polymer | Surfactants or Solvent |
| --- | --- | --- | --- |
| 68 | "ZELCON" PG 100 g | None | "IGEPAL CO" 970 10 g "BIOSOFT" D 40 10 g |
| 69 | "ZELCON" PG 45 g | "UCON" LB-625 9.0 g | "POLYWET" B 5.3 g |
| 70 | None | "UCON" LB-625 8 g | "POLYWET" B 1.1 g |
| 71 | None | "UCON" LB-625 3.0 g | Ethylacetate 297 g |
| 72 | "ZELCON" PG 3 g | None | Ethylacetate 297 g |

TABLE 22

Performance Testing

| Ex No. | Bath % Solids | Water Repellency Test Initial | Water Repellency Test After 1st "Insult" | No. of Successful "Insult" |
|---|---|---|---|---|
| 68 | 4.25 | w/w | w/w | 3+ |
| 69 | 1.5 | w/w | w/w | 3+ |
| 70 | 1.5 Solids on Fabric | w/w | w/w | 3+ |
| 71 | 1.33% | w/w | w/w | 2+ |
| 72 | 1.33% | 1 | 1/2 | 0 |

The above tests showed that the inventive compositions were effective on different fabrics and effective when applied from an organic solvent system.

EXAMPLES 73–78

The following compositions were prepared using the procedure of Example 1. Examples 73–74 were diluted in water as described below and padded onto polypropylene fabric and dried at 235° F. for two minutes before testing.

TABLE 23

| Ex. No. | Hydrophilic Polymer | Polypropylene Oxide Polymer | Surfactant |
|---|---|---|---|
| 73 | "ZELCON" PG 22.9 g | "UCON" LB-625 4.6 g | "POLYWET" A 1.1 g |
| 74 | "ZELCON" PG 22.9 g | "UCON" LB-625 4.6 g | "POLYWET" A 1.1 g |
| 75 | "ZELCON" PG 172 g | "UCON" LB-625 34.5 g | "POLYWET" A 22.5 g |
| 76 | Note 1: 22.9 g | "UCON" LB-625: 4.6 g | "POLYWET" A: 3.0 g |
| 77 | Note 1: 22.9 g | "UCON" LB-625: 4.6 g | "POLYWET" A: 3.0 g |
| 78 | Note 1: 22.9 g | "UCON" LB-625: 4.6 g | "POLYWET" A: 3.0 g |

Note 1: This polymer corresponded to "ZELCON" PG except that 10 mole % of the polyethylene glycol was replaced by polyethylene glycol methyl ether (950 molecular weight).

TABLE 24

Performance Testing

| Ex No. | Bath % Solids | Water Repellency Test Initial | Water Repellency Test After 1st "Insult" | No. of Successful "Insults" |
|---|---|---|---|---|
| 73 | 0.36% | 3 | not tested | 0 |
| 74 | 0.72% | w/w | w/w | 2 |
| 75 | 2.5% | w/w | w/w | 15+ |
| 76 | 0.36% | <1 | not tested | 0 |
| 77 | 0.72 | w/w | w/w | 4 |
| 78 | 2.5% | w/w | w/w | 15+ |

Based on measured wet pickups for this fabric in the padding operation of approximately 82%, a bath solids concentration of 0.36% corresponds to an application of 0.30% solids on weight of fabric. This produces a fabric that has improved hydrophilic character, but is not fully water wettable. At bath concentrations of 0.72% (corresponding to an application level of 0.59% solids on weight of fabric) or higher, a water wettable surface is obtained. At further increased application levels, more durability is achieved. The upper limit of application would be based on practicability.

EXAMPLE 79

The following composition was prepared using the procedure of Example 1. Example # was diluted in water as described below and padded onto a flash spun polyethylene fabric ("TYVEK", a product of E. I. du Pont de Nemours and Company) and dried at 200° F. (93° C.) before testing.

TABLE 25

| Ex. No. | Hydrophilic Polymer | Polypropylene Oxide Polymer | Surfactants or Solvent |
|---|---|---|---|
| 79 | "ZELCON" PG 464 g | "UCON" LB-625 93 g | "POLYWET" B 61 g |

TABLE 26

Performance Testing

| Ex No. | Bath % Solids | Water Repellency Test Initial | After 1st "Insult" | After 3rd "Insult" |
|---|---|---|---|---|
| 79 | 3.6% | w/w | <1 | <1 |

Based on measured wet pickups for this fabric in the padding operation of 33% to 50%, a bath solids concentration of 3.6% corresponded to an application of 1.2% to 1.8% solids on weight of fabric. This produced a fabric that was water wettable, but did not wet rapidly. After further water washes a small amount of material was removed so that the fabric was not water wettable, but nevertheless displayed improved hydrophilicity.

What is claimed is:

1. A composition comprising an aqueous dispersion of 1) a hydrophilic copolyester having repeating segments of a polyoxyethylene diester and a polyalkylene diester, and, 2) a polypropylene oxide polymer capped on one or both ends with an alkyl or ester group, said polymer having more than 4 propylene oxide units and up to about 2% ethylene oxide units, and an average molecular weight of at least about 300.

2. A composition comprising a mixture of 1) an organic solvent, 2) a hydrophilic copolyester having repeating segments of a polyoxyethylene diester and a polyalkylene diester; and 3) a polypropylene oxide polymer capped on one or both ends with an alkyl or ester group, said polymer having more than 4 propylene oxide units and up to about 2% ethylene oxide units and an average molecular weight of at least about 300.

3. A composition comprising an aqueous dispersion of 1) a hydrophilic copolyester having repeating segments of a polyoxyethylene diester and a polyalkylene diester, and 2) a polypropylene glycol having an average molecular weight greater than 1100.

4. A composition comprising a mixture of 1) an organic solvent, 2) a hydrophilic copolyester having repeating segments of a polyoxyethylene diester and a polyalkylene diester, and 3) a polypropylene glycol having an average molecular weight greater than 1100.

5. The composition of claim 1, 2, 3 or 4 further comprising a wetting agent, dispersing agent, surfactant or a mixture thereof.

6. The composition of claim 1, 2, 3, or 4 wherein the hydrophilic copolyester has been modified by reaction with at least one polyol containing at least three hydroxy groups, or with at least one polyoxyethylene glycol, or with a mixture thereof, to yield a copolyester having from 1 to about 40 weight percent of post reactant repeating units.

* * * * *